United States Patent
Rodriguez et al.

(10) Patent No.: US 6,350,811 B1
(45) Date of Patent: Feb. 26, 2002

(54) AQUEOUS POLYURETHANE DISPERSIONS CONTAINING PHENOLIC RESIN MOIETIES

(75) Inventors: Carmen L. Rodriguez, King of Prussia; Stephen L. Goldstein, Glen Mills, both of PA (US)

(73) Assignee: ARCO Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/489,064

(22) Filed: Jan. 21, 2000

(51) Int. Cl.[7] .............................. C08J 3/00; C08K 3/20; C08L 75/00; C08G 18/00
(52) U.S. Cl. ...................... 524/589; 524/590; 524/591; 524/839; 524/840; 528/44; 528/76; 528/85
(58) Field of Search .................. 524/589, 590, 524/591, 839, 840; 528/44, 76, 85

(56) References Cited

U.S. PATENT DOCUMENTS

| | | | |
|---|---|---|---|
| 4,167,538 A | 9/1979 | Taniguchi et al. | 525/438 |
| 4,241,201 A | 12/1980 | Annis | 525/503 |
| 5,354,808 A | 10/1994 | Onwumere | 524/837 |
| 5,889,137 A | 3/1999 | Hutchings | 528/205 |
| 6,245,877 B1 * | 6/2001 | Rodriguez et al. | 528/79 |

FOREIGN PATENT DOCUMENTS

WO   WO 97/19972   *   6/1997

OTHER PUBLICATIONS

Cyanamid Bulletin Aqueous Polyurethane Dispersions From TMXDI (META) Aliphatic Isocyanate, 1992.*

* cited by examiner

Primary Examiner—Patrick D. Niland
(74) Attorney, Agent, or Firm—Shao Guo

(57) ABSTRACT

A water-dispersible polyurethane resin is disclosed. The resin comprises recurring units of an alkoxylated phenolic resin, a carboxylate-containing diol, and a multifunctional isocyanate. The resin, which can be neutralized, and/or chain-extended, is dispersed in water to form a polyurethane dispersion. Coatings derived from the polyurethane dispersions have excellent acid and chemical resistance.

13 Claims, No Drawings

AQUEOUS POLYURETHANE DISPERSIONS CONTAINING PHENOLIC RESIN MOIETIES

FIELD OF THE INVENTION

The invention relates to water-dispersible polyurethane resins and aqueous polyurethane dispersions. In particular, the invention relates to water-dispersible polyurethane resins derived from alkoxylated phenolic resins, and aqueous polyurethane dispersions made from the water-dispersible resins.

BACKGROUND OF THE INVENTION

Water-borne polyurethanes have been commercially available since the 1960's. Their use has grown steadily through the years. Initially, the acceptance of water-borne polyurethanes was spurred by the need to reduce VOCs (volatile organic compounds) in coatings. However, in the last decade the properties of water-borne polyurethanes have started to approach the properties of solvent-based polyurethanes.

In general, there are two types of water-borne polyurethane coatings: aqueous polyurethane dispersions and two-component water-borne polyurethanes. Two-component water-borne polyurethanes are prepared by combining a hydroxyl functional resin component and an isocyanate component. These two components are packed separately, dispersed in water, and mixed in a desired ratio prior to application.

Aqueous polyurethane dispersions are high molecular weight, essentially linear polyurethanes or ureas dispersed in water. They are more convenient to use than two-component water-borne polyurethanes. Water dispersibility of the polyurethane is generally achieved by introducing ionic groups along the polymer backbone. The ionic source is usually carboxylate, sulfonate, or amine groups (e.g., see U.S. Pat. No. 5,354,808). Most commercial polyurethane dispersions use the carboxylate-containing compound, dimethylolpropionic acid (DMPA), as the ionic source because it has a structure well suited for this technology. DMPA is a primary diol that can be easily incorporated into the polyurethane backbone. Its carboxyl group is located on a sterically hindered tertiary carbon that minimizes its reactivity with isocyanate.

Preparation of polyurethane dispersions involves several steps: preparing an isocyanate (NCO)-terminated prepolymer; neutralizing the carboxyl groups; extending the polyurethane chain; and dispersing the resin in water. Chain extension can be performed before or after dispersion. When chain extension is performed before forming the dispersion, the NCO-terminated prepolymer is generally reacted with a chain extender in the presence of a volatile organic solvent such as acetone. The solvent usually is evaporated after the polyurethane is dispersed in water. When the chain extension is performed after the dispersion, a chain extender is added into water in which the polyurethane is dispersed. The latter process usually has a lower production cost.

Due to a lack of crosslinking, polyurethane dispersions usually give coatings that have less resistance to moisture, chemicals, and corrosion.

Phenolic resins have been widely used in coatings, adhesives, and molded articles. Most commonly used phenolic resins are prepared by reacting phenols with aldehydes. The reaction usually produces a phenolic resin with a functionality of greater than 3. Because phenolic hydroxyl groups react very slowly with isocyanates, phenolic resins have found very limited use in polyurethanes.

Aralkylated phenolic resins are also known. They are prepared by reacting phenols with styrene or substituted styrene. Compared with phenolic resins prepared from phenols and aldehydes, aralkylated phenolic resins have a better-controlled functionality. It is feasible to make a di- or tri-functional aralkylated phenolic resin.

Methods for alkoxylating phenolic resins are also known in the art. For example, U.S. Pat. No. 4,167,538 teaches the preparation of alkoxylated aralkylated phenolic resins. The alkoxylated aralkylated phenolic resins can be emulsified and used, for example, for surface-treating fibers.

However, water-dispersible polyurethane resins containing phenolic resin moieties and their dispersions are unknown. We have surprisingly found that incorporating phenolic resins into polyurethane dispersions significantly enhances the resistance of coatings to moisture, acids, chemicals, and corrosion.

SUMMARY OF THE INVENTION

The invention is a water-dispersible polyurethane resin. The resin comprises from about 5% to about 75% by weight of recurring units of an alkoxylated phenolic resin, from about 5% to about 25% by weight of recurring units of a carboxylate-containing diol, and about 15% to about 75% by weight of recurring units of a multi-functional isocyanate. The resin has a number average molecular weight within the range of about 2,500 to about 500,000, an acid number within the range of about 10 to about 100 mg KOH/g, and a free NCO content within the range of about 2.5% to 15% by weight.

The invention includes a neutralized resin, which is a reaction product of the water-dispersible resin with a neutralizing agent, and a chain-extended resin, which is a reaction product of the water-dispersible resin with a chain extender. The invention also includes a chain-extended and neutralized resin that is prepared by neutralizing the chain-extended resin or chain-extending the neutralized resin.

The invention also includes aqueous dispersions of the water-dispersible resin, the neutralized resin, the chain-extended resin, and the chain-extended and neutralized resin.

DETAILED DESCRIPTION OF THE INVENTION

The water-dispersible polyurethane resins of the invention comprise from about 5% to about 75% by weight of recurring units of an alkoxylated phenolic resin. Preferably, the polyurethane resins contain from about 25% to about 50% by weight of recurring units of an alkoxylated phenolic resin.

Alkoxylated phenolic resins used in the invention preferably have an average hydroxyl functionality from about 2 to about 10, more preferably about 2 to about 5, and most preferably about 2 to about 3. Alkoxylated phenolic resins with high hydroxyl functionality can cause gel formation in the preparation of water-dispersible polyurethane resins. The alkoxylated phenolic resins preferably have a number average molecular weight (Mn) from about 500 to about 10,000, more preferably about 500 to about 5,000, and most preferably from about 500 to about 2,000. They also preferably have an average oxyalkylene chain length from about 1 to about 15, more preferably about 1 to about 10, and most preferably about 1 to about 5. The longer the oxyalkylene chain, the more flexible the alkoxylated phenolic resins. However, long oxyalkylene chains may result in final coating products with poorer weathering stability and less chemical resistance.

Alkoxylated phenolic resins used in the invention include propoxylated, ethoxylated, and butoxylated phenolic resins, and the like, and mixtures thereof. They also include alkoxylated phenolic resins that have mixtures of oxyalkylene units.

The alkoxylated phenolic resins can be prepared by alkoxylation of phenolic resins. Phenolic resins used in the alkoxylation include the reaction products of phenols and aldehydes. Methods for preparing phenolic resins from phenols and aldehydes are known. For example, U.S. Pat. No. 4,241,201, the teachings of which are incorporated herein by reference, discloses the preparation of phenolic resins from 2,2-bis(4-hydroxyphenyl)propane (bisphenol A) and an aldehyde.

Phenolic resins used in the alkoxylation also include aralkylated phenolic resins. Aralkylated phenolic resins are made, for example, by reacting a phenolic monomer or resin with styrene or a substituted styrene. U.S. Pat. No. 5,889,137, the teachings of which are incorporated herein by reference, discloses the preparation of aralkylated phenolic resins.

There are many ways to alkoxylate phenolic resins. They can be alkoxylated by either alkylene oxides or alkylene carbonates. For example, U.S. Pat. No. 4,167,538, the teachings of which are incorporated herein by reference, discloses the preparation of alkoxylated phenolic resins with alkylene carbonates.

Water-dispersible polyurethane resins of the invention contain from about 5% to about 25% by weight of recurring units derived from a carboxylate-containing diol. Preferably, the resins contain from about 10% to about 20% by weight of recurring units derived from a carboxylate-containing diol. A preferred carboxylate-containing diol is dimethylolpropionic acid (DMPA).

Optionally, the water-dispersible polyurethane resins of the invention contain recurring units derived from other hydroxyl functional resins. Examples of hydroxyl functional resins are hydroxyl acrylic resins, polyester polyols, polyether polyols, polyetherester polyols, polycarbonate polyols, styrene-allyl alcohol copolymers, acrylate-allyl alcohol copolymers, and the like, and mixtures thereof. Incorporating these hydroxyl functional resins may either improve performance of the water-dispersible polyurethane or reduce the product cost. The resins preferably have an average hydroxyl functionality from about 2 to about 5, and more preferably from about 2 to about 3. The amount of these hydroxyl functional resins used depends on many factors, mainly on the desired performance of the water-dispersible polyurethane. For example, incorporating a polyether polyol such as polypropylene glycol can lower the glass transition temperature ($T_g$) and increase the flexibility of the polyurethane.

Optionally, the water-dispersible polyurethane resins can also contain recurring units of other hydroxyl compounds. Examples of hydroxyl compounds are glycols, diols and triols such as ethylene glycol, propylene glycol, butanediol, hexanediol, glycerin, and the like, and mixtures thereof. These lower molecular weight hydroxyl compounds may be used to increase the hard segment content of the polyurethane and thereby improve the performance of the resulting polymer. They are used preferably in an amount less than 10% by weight, more preferably less than 5% by weight, of the polyurethane composition.

The water-dispersible polyurethane resins of the invention contain from about 15% to about 75% by weight of a multifunctional isocyanate. Mutilfunctional isocyanates useful for making water-dispersible polyurethanes of the invention include diisocyanates, polyisocyanates, and isocyanate-terminated prepolymers known in the polyurethane industry. Isocyanate-terminated prepolymers are usually made from a multifunctional isocyanate and a polyether polyol, polyester polyol, or acrylic polyol, or the like. While aromatic isocyanates can be used, aliphatic isocyanates are preferred for improved weathering stability. Preferred isocyanates include, for example, 1,6-hexamethylene diisocyanate (HDI), polymeric HDIs, isophorone diisocyanate (IPDI), polymeric IPDIs, and IPDI- or HDI-based isocyanate-terminated prepolymers such as, for example, AIRTHANE ASN-540M prepolymer (product of Air Products). The multifunctional isocyanate is used in an amount so as to have a molar ratio of NCO to hydroxyl (OH) groups greater than 1/1, preferably greater than 1.5/1.0.

The water-dispersible polyurethane resins of the invention have a number average molecular weight from about 2,500 to about 500,000. Preferably, the resins have a number average molecular weight from about 5,000 to about 50,000. If the molecular weight is too low, the resins will lack sufficient physical strength or other properties. If the molecular weight is too high, the resins are difficult to disperse.

The water-dispersible polyurethane resins of the invention have an acid number from about 10 to about 100 mg KOH/g. Preferably, the resins have an acid number from about 20 to about 50 mg KOH/g. If the acid number is too low, the resins are difficult to disperse. If the acid number is too high, coatings derived from the resins may be sensitive to water or moisture.

The water-dispersible resins have a free NCO content from about 2.5% to 15% by weight. Preferably, the resins have a free NCO content from about 4.0% to about 8% by weight. If the NCO content is too low, the resins are difficult to chain extend. If the NCO content is too high, the resins are costly because isocyanates are expensive.

The water-dispersible polyurethane resins of the invention are preferably prepared by solution polymerization of the alkoxylated phenolic resin, carboxylate-containing diol, multifunctional isocyanate, and other optional components. Suitable solvents for use in the polymerization include ethers, esters, ketones, aromatic and aliphatic hydrocarbons, glycol ether esters, lactams, and the like, and mixtures thereof. N-methyl-2-pyrrolidinone (NMP) and glycol ether esters such as propylene glycol methyl ether acetate (PMAc) are preferred because they can be kept in the resins and used as coalescing agents in the polyurethane dispersions.

The polymerization reaction is preferably performed at a temperature within the range of about 25° C. to about 95° C., preferably about 50° C. to about 80° C. The reaction is complete when the desired NCO content is achieved. The reaction is usually rapid, but a polyurethane reaction catalyst can optionally be added to accelerate the reaction. Suitable catalysts include amines, organozinc and organotin compounds such as stannous octoate, dibutyltin dilaurate, and the like. The amount of catalyst used is usually less than 1% of the resin composition.

The water-dispersible polyurethane resins of the invention have many applications. They can be used for coatings and adhesives, and as additives for detergents, cements, and plastics. For example, they can be used as the isocyanate component in a two-component solvent-based polyurethane coating.

Water-dispersible polyurethane resins can be reacted with neutralizing agents to give the neutralized polyurethane resins of the invention. Useful neutralizing agents are preferably selected from alkali and alkaline earth metal hydroxides, ammonia, and organic amines. Tertiary amines are more preferred. Examples of neutralizing agents are sodium hydroxide, potassium hydroxide, magnesium hydroxide, triethylamine, trimethylamine, diethanolamine, triethanolamine, N,N-dimethylethanolamine, and the like, and mixtures thereof. Neutralizing agents are used in an amount sufficient to convert at least some of the acid groups to their salts. The degree of neutralization depends on the desired applications. Neutralized polyurethane resins of the invention can be used to formulate, for example, two-component water-borne polyurethane coatings, and two-component solvent-based polyurethane coatings. When the neutralized resins are used to formulate water-borne coatings, a relatively high degree of neutralization is needed for water dispersibility. When the neutralized resins are used for solvent-based coatings, a high degree of neutralization is not necessary.

The water-dispersible polyurethane resins can be reacted with a chain extender to give the chain-extended polyurethane resins of the invention. Preferred chain extenders are $C_1$ to $C_{20}$ aliphatic or aromatic multifunctional amines. Difunctional amines are more preferred chain extenders because they yield high molecular weight chain-extended polyurethanes without forming gels during the chain extension. Examples of chain extenders are ethylene diamine, 1,6-hexanediamine, diaminopentane, and the like. The amount of chain extender used depends on the desired molecular weight of chain-extended polyurethane. When the molar ratio of free NCO groups of the water-dispersible polyurethane to amino groups of chain extender is close to 1/1, chain-extended polyurethane resins of high molecular weight are obtained.

The chain-extended polyurethane resins of the invention can be neutralized to convert them into chain-extended and neutralized resins of the invention. Suitable neutralizing agents are discussed above.

The chain-extended and neutralized polyurethane resins of the invention can also be prepared by reacting neutralized resins of the invention with a chain extender. Suitable chain extenders are discussed above.

The water-dispersible polyurethane resins, neutralized resins, chain-extended resins, and neutralized and chain-extended resins can be dispersed in water to produce polyurethane dispersions of the invention.

Polyurethane dispersions derived from water-dispersible resins of the invention contain, in addition to the water-dispersible resin, water, a base, and an optional organic solvent. Base is used to neutralize the water-dispersible resin in situ to form a stable dispersion and to adjust the pH of the dispersion. Suitable bases (neutralizing agents) are discussed above. Polyurethane dispersions derived from the water-dispersible resins of the invention optionally contain a chain extender to perform chain extension in situ. Suitable chain extenders are discussed above. Optional organic solvents function as coalescing agents. Suitable organic solvents include ethers, esters, ketones, glycol ether esters, lactams, and the like, and mixtures thereof.

Polyurethane dispersions derived from the neutralized polyurethane resins of the invention contain, in addition to the neutralized polyurethane resin, water, an optional base, an optional organic solvent, and an optional chain extender. Base is used to adjust the pH of the dispersions. The functions and selection of optional organic solvents and chain extenders are discussed above.

Polyurethane dispersions derived from the chain-extended polyurethane resins of the invention contain, in addition to the chain-extended polyurethane resin, water, a base, and an optional organic solvent. The functions and selection of base, and optional organic solvent are discussed above.

Polyurethane dispersions derived from the neutralized and chain-extended polyurethane resins of the invention contain, in addition to the neutralized and chain-extended polyurethane resin, water, an optional base, and an optional organic solvent. The functions and selections of base and organic solvent are discussed above.

The polyurethane dispersions of the invention are preferably prepared by slowly adding a resin as described above into water. The dispersing process is performed preferably with high speed mixing (2,000 to 5,000 revolutions per minute) and preferably at a temperature within the range of about 40° C. to about 70 C., more preferably 45° C. to 55° C. Polyurethane dispersions of the invention have a solids content of from about 20% to about 60% by weight, and a viscosity at 25° C. from about 10 to about 20,000 mPa.s. They have a pH value from about 5.5 to about 11, preferably from about 6.5 to about 8.5.

The polyurethane dispersions of the invention can be blended with other water-soluble or water-dispersible resins. For example, they can be blended with conventional polyurethane dispersions derived from polyether polyols or polyester polyols.

The polyurethane dispersions of the invention have many applications. For example, they can be used as water-borne coatings, sealants, and adhesives. Optionally, the polyurethane dispersions of the invention are combined with flow aids, thixotropes, pigments, surfactants, fillers, dyes, and other additives for coatings and adhesives.

Coating formulations of the invention are applied using techniques that are well known in the art. For example, the formulations can be applied by roller, brush, spray or any other suitable means. The coatings are dried when the water and organic solvents evaporate at elevated or ambient temperature.

A key advantage of the invention is to provide polyurethane dispersions that give coatings that have excellent corrosion and chemical resistance as demonstrated by the following examples.

The following examples merely illustrate the invention. Those skilled in the art will recognize many variations that are within the spirit of the invention and scope of the claims.

EXAMPLE 1

Preparation of Water-Dispersible Polyurethane

A 750 mL 4-neck resin kettle equipped with a gas bubbler, a mechanical stirrer, a thermometer, and a condenser is charged with, a difunctional propoxylated styrenated phenolic resin (Arylflexex® DS, product of Lyondell Chemical Company, 89.4 g, 0.194 eq.), dimethylolpropionic acid (DMPA) (9.78 g, 0.146 eq.), and N-methyl-2-pyrrolidinone (75 g). The reactor contents are heated to 60° C. with nitrogen flow and agitation. After the DMPA is completely dissolved, the solution is cooled to 45° C. Methylene bis (cyclohexyl isocyanate) ($H_{12}$MDI, Desmodur W, product of Bayer) (75.84 g, 0.578 eq.) and stannous octoate (0.02 g) are added to the reactor. The reactor contents are agitated, heated at 80° C. until the prepolymer formed has a free NCO content of about 4.0% (about 4.5 hours).

Neutralization

The above reaction mixture is then cooled to 45° C. Triethylamine (TEA) (7.01 g, 0.07 eq.) is added to neutralize the prepolymer. Tinuvin 123 (hindered amine light stabilizer, product of Ciba) (0.45 g) and Tinuvin 900 (benzotriazole UV absorber, product of Ciba) (0.45 g) are also added to the prepolymer and mixed well.

Dispersing

A 1000 mL 4-neck resin kettle equipped with a Dispersmat® stirrer which is fitted with a Cowlese blade is charged with 281.0 grams of deionized water (D. I. water). The reactor is heated to 50° C. with stirring at 2,000 rpm. The above resulting prepolymer (225 g) is heated to 80° C., and then slowly added to the reactor with agitation. 2-Methyl-1,5-diaminopentane (10.2 g, 0.175 eq., product of DuPont: Dytek A) is dissolved in 20.4 grams of D. I. water, and then the aqueous solution is added dropwise, down the shaft of the stirrer, to the reaction mixture. The resulting milky dispersion is allowed to stand at 25° C. for at least 24 hours before it is used.

Coating

The resulting polyurethane dispersion is coated onto the cold roll steel panels by draw down at 10 mils of wet thickness. The panels are air-dried for one hour at 25° C. and then baked for 45 minutes at 72° C. and under 50% relative humidity. The panels are conditioned at 25° C. and under 50% relative humidity for 7 days, and then tested.

The coating physical properties are listed in Table 2 and the chemical resistance in Table 3.

EXAMPLES 2–3

The procedure of Example 1 is repeated, but blends of a propoxylated styrenated phenolic resin and a polyester polyol are used. The amounts of the other reagents are adjusted accordingly as shown in Table 1.

COMPARATIVE EXAMPLE 4

Polyurethane Dispersions from Polyester Polyol The procedure of Example 1 is repeated, but a butanediol adipate polyester polyol, Lexorez® 1150 (hydroxyl number: 109.5 mg KOH/g, product of Inolex) is used instead of the propoxylated styrenated phenolic resin. The amounts of the other reagents are adjusted accordingly as shown in Table 1.

COMPARATIVE EXAMPLE 5

Polyurethane Dispersions from Polyester Polyol

The procedure of Example 1 is repeated, but a polyester polyol of neopentyl glycol, 1,6-hexanediol, adipic acid, and isophthalic acid, Fomrez® 8056 (hydroxyl number: 94.9 mg KOH/g, product of Witco) is used instead of the propoxylated styrenated phenolic resin. The amounts of the other reagents are adjusted accordingly as shown in Table 1.

TABLE 1

Preparation of Polyurethane Dispersions

| Ex. # | Arylflex DS | Lexorez-1150 | Fomrez-8056-93 | Desmodur W | DMPA | TEA | Dytek A |
|---|---|---|---|---|---|---|---|
| 1 | 89.4 | — | — | 75.8 | 9.8 | 7.0 | 10.2 |
| 2 | 21.4 | 71.7 | — | 72.5 | 9.4 | 6.7 | 10.1 |
| 3 | 20.1 | — | 77.7 | 68.4 | 8.8 | 6.3 | 9.5 |

TABLE 1-continued

Preparation of Polyurethane Dispersions

| Ex. # | Arylflex DS | Lexorez-1150 | Fomrez-8056-93 | Desmodur W | DMPA | TEA | Dytek A |
|---|---|---|---|---|---|---|---|
| C4 | — | 94.3 | — | 71.5 | 9.2 | 6.6 | 9.9 |
| C5 | — | — | 100.3 | 66.2 | 8.5 | 6.1 | 9.2 |

TABLE 2

Physical Properties of Polyurethane Dispersion Coatings

| Ex. # | T-Bend | Gardner Impact, direct | Gardner Impact, reverse | Cross Hatch Adhesion | Pencil Hardness | 20° Gloss | 60° Gloss |
|---|---|---|---|---|---|---|---|
| 1 | pass | >160 | >160 | pass | 4H | 84 | 112 |
| 2 | pass | >160 | >160 | pass | 4H | 80 | 93 |
| 3 | pass | >160 | >160 | pass | 4H | 89 | 109 |
| C4 | pass | >160 | >160 | pass | 4H | 79 | 90 |
| C5 | pass | >160 | >160 | pass | 4H | 81 | 93 |

TABLE 3

Chemical Resistance of Polyurethane Dispersion Coatings

| Ex. # | 20% HCl | 20% $H_2SO_4$ | 20% $H_3PO_4$ | 10% HOAc | 10% $HNO_3$ | 10% KOH | MEK |
|---|---|---|---|---|---|---|---|
| 1 | No Effect | No Effect | No Effect | No Effect | No Effect | No Effect | No Effect |
| 2 | No Effect | No Effect | No Effect | Severe Effect | Decomposed | Slight Effect | Slight Effect |
| 3 | No Effect | No Effect | — | Severe Effect | Decomposed | Slight Effect | No Effect |
| C4 | Slight Effect | Slight Effect | Slight Effect | Severe Effect | Decomposed | No Effect | Slight Effect |
| C5 | No Effect | Slight Effect | No Effect | Severe Effect | Decomposed | No Effect | Slight Effect |

We claim:

1. A water-dispersible polyurethane resin that comprises recurring units of (a) from about 5% to about 75% by weight of an alkoxylated phenolic resin having a hydroxyl functionality within the range of about 2 to about 3;

(b) from about 5% to about 25% by weight of a carboxylate-containing diol; and (c) from about 15% to about 75% by weight of a multi-functional isocyanate;

wherein the water-dispersible resin has a number average molecular weight within the range of about 2,500 to about 500,000, an acid number within the range of about 10 to about 100 mg KOH/g, and a free NCO content within the range of about 2.5% to about 15% by weight.

2. The water-dispersible resin of claim 1 wherein the alkoxylated phenolic resin is an ethoxylated phenolic resin.

3. The water-dispersible resin of claim 1 wherein the alkoxylated phenolic resin is a propoxylated phenolic resin.

4. The water-dispersible resin of claim 1 wherein the alkoxylated phenolic resin has a mixture of oxypropylene and oxyethylene units.

5. The water-dispersible resin of claim 1 wherein the alkoxylated phenolic resin has an average oxyalkylene units from about 1 to about 15.

6. The water-dispersible resin of claim 1 wherein the carboxylate-containing diol is dimethylolpropionic acid.

7. A neutralized resin that comprises the reaction product of
(a) the water-dispersible resin of claim 1; and
(b) a neutralizing agent, in an amount effective to convert at least some of the acid groups of the water-dispersible resin to salts.

8. A chain-extended resin that comprises the reaction product of
(a) the water-dispersible resin of claim 1; and
(b) a chain extender.

9. A polyurethane dispersion that comprises:
(a) water;
(b) the water-dispersible resin of claim 1;
(c) a base, in an amount effective to give the dispersion a pH value within the range of about 5.5 to about 11;
(d) an optional organic solvent; and
(e) an optional chain extender;
wherein the dispersion has a solids content within the range of about 20 to about 60% by weight, and a viscosity at 25° C. within the range of about 10 to about 20,000 mPa.s.

10. A neutralized and chain-extended resin that comprises the reaction product of
(a) the neutralized resin of claim 7; and
(b) a chain extender.

11. A dispersion that comprises
(a) water;
(b) the neutralized and chain-extended resin of claim 10;
(c) an optional base, in an amount effective to give the dispersion a pH value within the range of about 5.5 to about 11; and
(d) an optional organic solvent;
wherein the dispersion has a solids content within the range of about 20 to about 60% by weight, and a viscosity at 25° C. within the range of about 10 to about 20,000 mPa.s.

12. A neutralized and chain-extended resin that comprises the reaction product of
(a) the chain-extended resin of claim 8;
(b) a neutralizing agent, in an amount effective to convert at least some of the acid groups of the water-dispersible resin to salts.

13. A dispersion that comprises
(a) water;
(b) the neutralized and chain-extended resin of claim 12;
(c) an optional base, in an amount effective to give the dispersion a pH value within the range of about 5.5 to about 11; and
(d) an optional organic solvent;
wherein the polyurethane dispersion has a solids content within the range of about 20 to about 60% by weight, and a viscosity at 25° C. within the range of about 10 to about 20,000 mPa.s.

* * * * *